Figure 1:
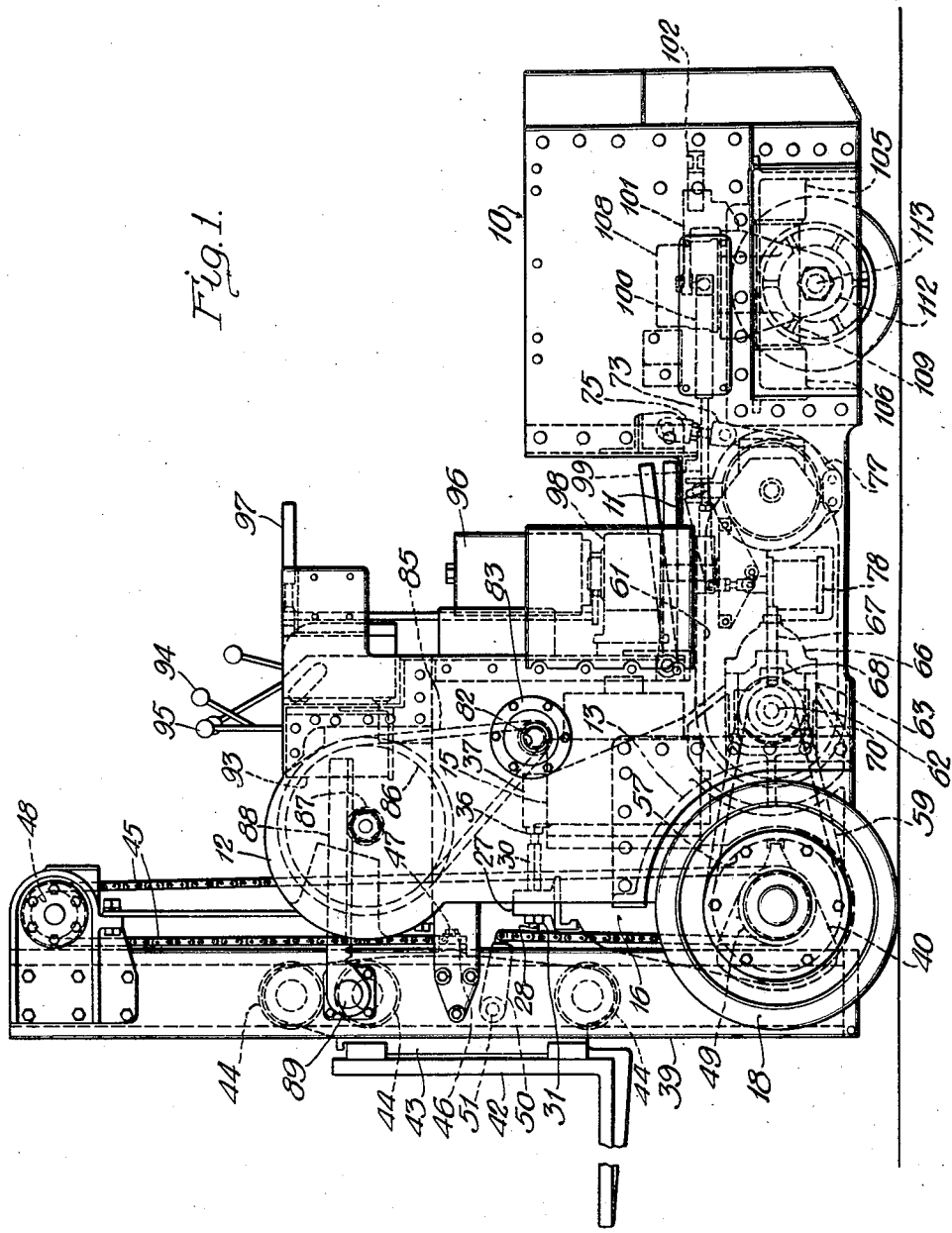

Dec. 1, 1942. B. ULINSKI 2,304,040
POWER UNIT MOUNTING FOR INDUSTRIAL TRUCKS
Original Filed Aug. 19, 1937 5 Sheets-Sheet 3
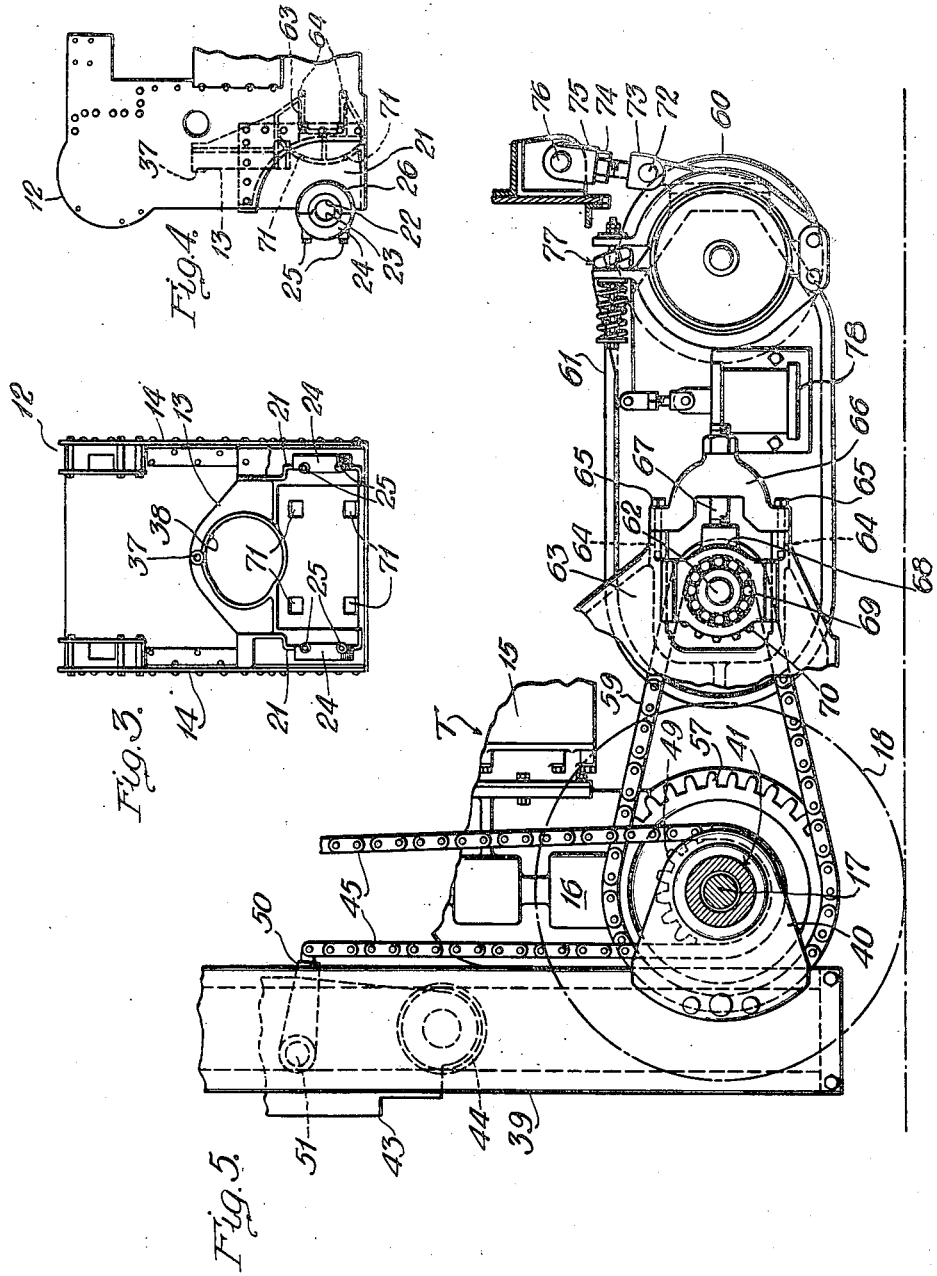
INVENTOR
B. ULINSKI
BY A. H. Golden
ATTORNEY Dec. 1, 1942.    B. ULINSKI    2,304,040
POWER UNIT MOUNTING FOR INDUSTRIAL TRUCKS
Original Filed Aug. 19, 1937    5 Sheets-Sheet 4
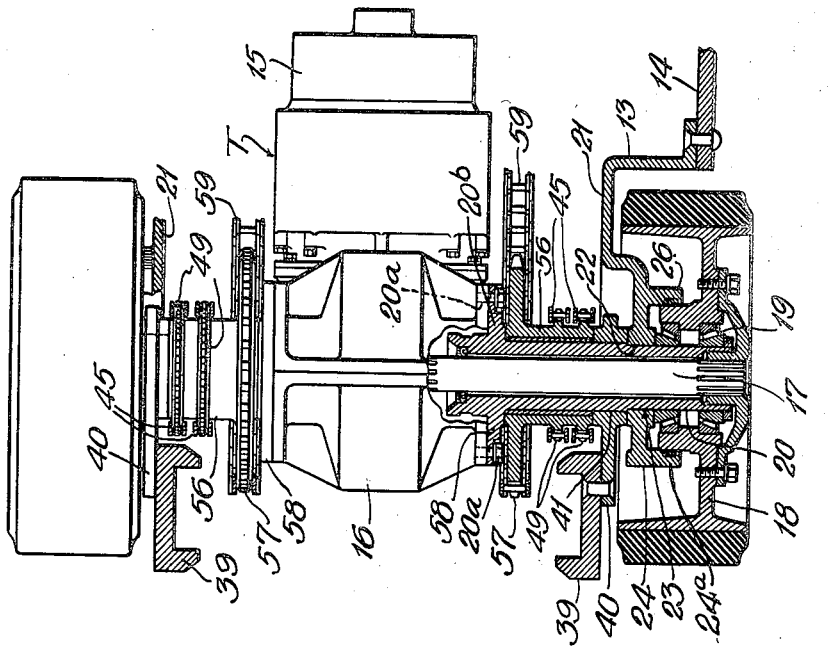
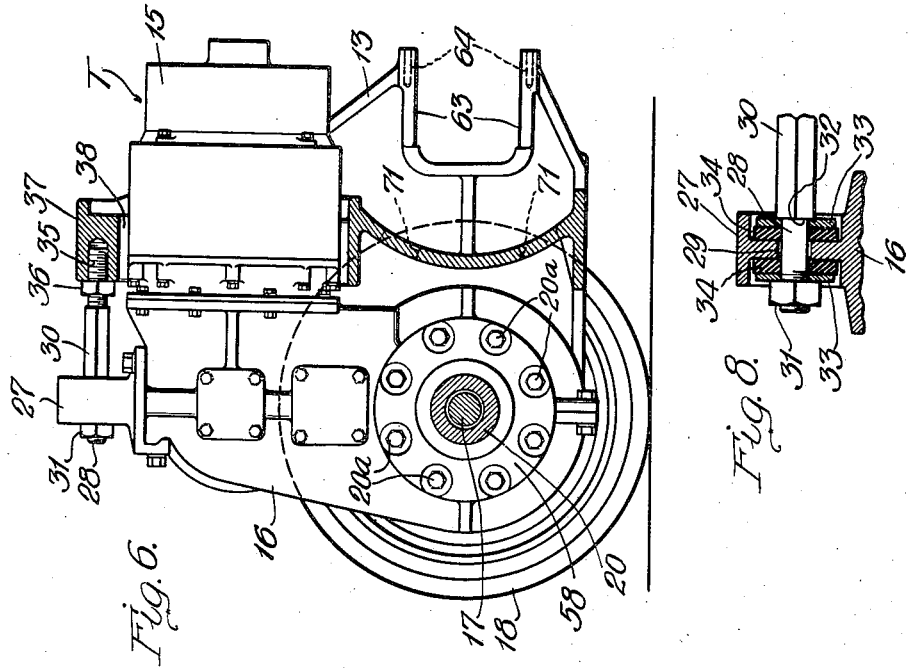
INVENTOR
B. ULINSKI
BY 
ATTORNEY Dec. 1, 1942.   B. ULINSKI   2,304,040
POWER UNIT MOUNTING FOR INDUSTRIAL TRUCKS
Original Filed Aug. 19, 1937   5 Sheets-Sheet 5
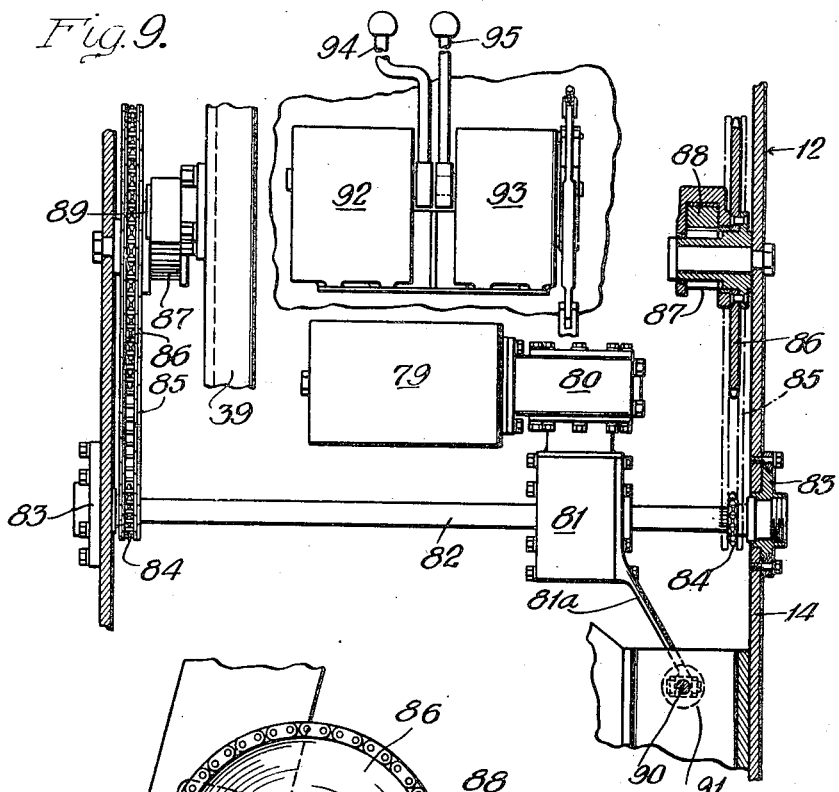
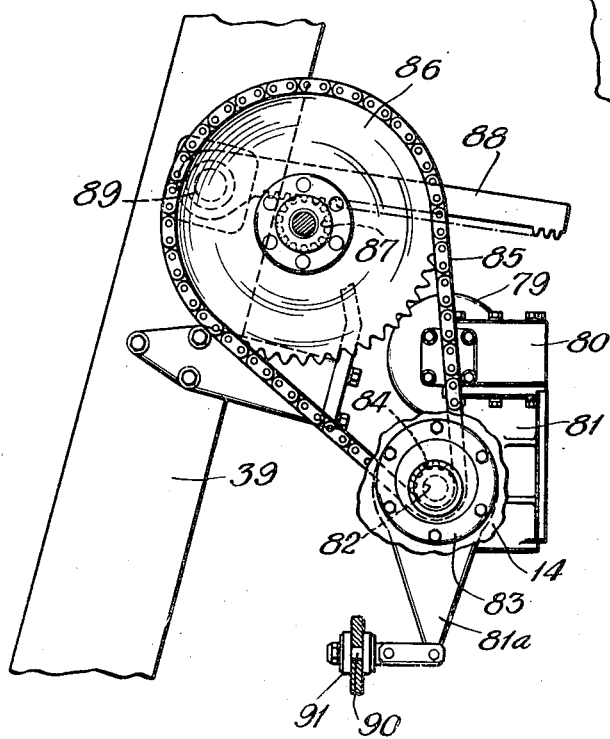
INVENTOR
B. ULINSKI
BY A. H. Golden
ATTORNEY Patented Dec. 1, 1942

2,304,040

UNITED STATES PATENT OFFICE 2,304,040

POWER UNIT MOUNTING FOR INDUSTRIAL TRUCKS

Bronislaus Ulinski, Chicago, Ill., assignor to The Yale & Towne Manufacturing Company, Stamford, Conn., a corporation of Connecticut Original application August 19, 1937, Serial No. 159,824. Divided and this application December 9, 1939, Serial No. 308,350

4 Claims. (Cl. 180—54)

This invention relates to an electric industrial truck of the type adapted for moving heavy industrial loads, and is a division of my application for patent, Serial No. 159,824, filed August 19, 1937, now Patent No. 2,207,688.

Industrial trucks of the class including my invention are usually equipped with a main frame having a battery box containing a battery, a series of supporting wheels, and a power traction unit for driving certain of the wheels. In addition, there are present a pair of vertical uprights which are mounted for tilting, and are tilted by a power unit, called a tilting unit. On the uprights there is usually mounted a platform which moves up and down on the uprights through means of rollers, and is so moved by a third power unit, which is called a lifting unit. In addition, in trucks of especially heavy capacity, there will be a fourth power unit for steering the truck.

It is obvious that the presence of these various power units all on one truck, presents a problem in design. It is necessary that the several units be mounted effectively, and in such a manner that they will be readily accessible, simple to assemble and install, and economical of space. As one of the salient features of my invention, I have conceived and developed highly desirable mountings for my various power units, and more particularly, the traction unit.

Broadly, my invention comprises the mounting of the traction unit so that it is pivotally supported on the main frame in the axis of the power shaft driven by it, and is maintained against movement of displacement relatively to the main frame. To absorb the torque tending to rotate the unit about the said shaft when power is applied to the shaft, I have a connection between the traction unit and the main frame of the truck. Thus, my traction unit is mounted on the axis of its drive shaft, and the traction torque is accepted by an arm extending from the traction unit and preferably secured to the main frame. This arm is preferably of a type mounted for resisting forces of tension and compression, and is therefore positioned functionally tangential to the circle of rotation of the traction unit on the main frame. There is, of course, considerable novelty in the structure of my traction unit as well as in the mounting thereof, all as will be quite apparent from a reading of the specification which follows.

While the basis of this application is the traction unit per se, and the means for mounting it, I shall describe herein the truck disclosed in my application supra, in order that the relation of the traction unit thereto may be better understood. I should like to indicate, however, that since the principles of my contribution to the art may be embodied in a number of different specific forms, I do not wish to be limited in my patent monopoly to the construction and details to be described hereinafter. I desire, rather, that my patent monopoly protect me against the utilization of the principles of my invention by others in specific forms different from those herein set forth.

Figure 2:
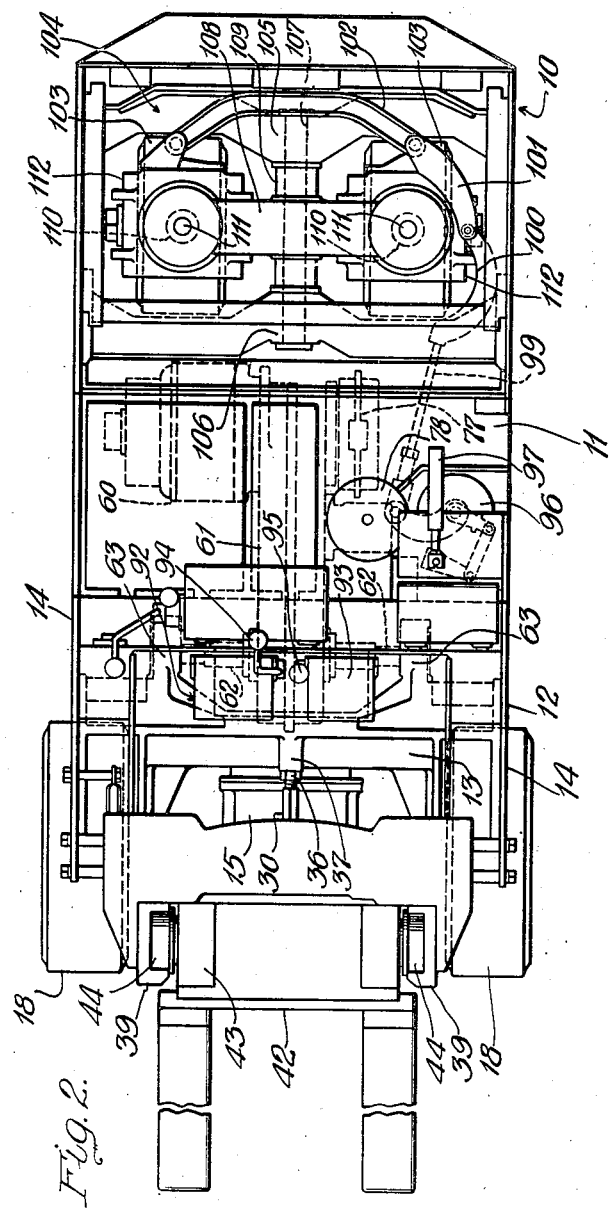

I shall now refer to the drawings wherein Fig. 1 is a side view of a truck embodying my invention. Fig. 2 is a plan view of the truck of Fig. 1. Fig. 3 is an end view of the main frame of the truck, showing the mounting of a cross frame member relatively to the main side plates of my truck. Fig. 4 is a side view of the forward portion of the main frame of my truck illustrating the mounting of the cross frame member referred to in describing Fig. 3. Fig. 5 illustrates in detail the mounting of the platform lift unit, as it will be called, and the transmission of the power from said lift unit to the elevating platform. Fig. 6 is an elevation and partial section of the traction unit of my invention, illustrating its relation to the cross frame member. Fig. 7 is a partial section of the mechanism of Fig. 6 taken from a point below Fig. 6 looking upwardly. Fig. 8 shows in section the details of the mounting of the connecting bar extending from the traction unit to the cross frame member. Fig. 9 is an elevation and partial section illustrating the mounting of the unit for tilting the uprights of my invention, this unit being called the tilt unit. Fig. 10 is an elevation and partial section illustrating also the operation of the tilt unit.

Referring now more particularly to the drawings and especially to Figs. 1 and 2, my truck embodies a main frame having a rear portion 10, a medial lowered portion 11 in the form of a platform on which the truck operator may stand, and a forward raised portion 12. It is the forward portion 12 which carries an important portion of the main frame called by me a cross frame member, designated by reference numeral 13 in Figs. 3 and 4. This cross frame member is so secured to the portions extending from the side main plates 14 of the truck that it may be considered integral with the said side main plates.

Having now set forth the general construction of the main frame, I shall first describe the traction unit of my invention. This traction unit is designated by the letter T, and is best shown in Figs. 6 and 7, although its relation to the truck is well set forth in Fig. 1. The traction unit comprises a motor housing 15 which contains a suitable electric motor, which through a suitable set of gears contained in the gear box 16 drives the horizontally extending drive shaft 17 to which are secured each of the wheels 18, as is probably best illustrated in Fig. 7. While the wheels 18 are driven by the drive shaft 17, they are preferably each mounted for rotation through roller bearings 19 about what I shall term sleeves 20 which surround the drive shaft 17.

The two sleeves 20, one extending from each side of the gear box 16, are secured to the lower end of the gear box by a series of bolts 20a passing through flanges 20b formed integrally with the said sleeves. At their opposite ends, the sleeves 20 are assembled for rotation relatively to the main frame through the cross frame member 13 already described. This cross frame member 13 has a pair of extensions 21 (Fig. 4), each having a bearing portion 22 formed thereon. Each of these bearing portions 22 has a related bearing portion 23 formed on a removable bearing 24, each of the laterally extending sleeves being secured to the cross frame member through the fastening of bearing 24 to extension 21 by bolts 25. It is in this manner that the traction unit is secured in position to the main frame. As will be noted in Fig. 7, each of the wheels 18 is properly supported on its sleeve 20 through bearings 19, and is further held in position by a laterally extending portion 26 of each of the portions 21 of the cross frame member 13, and a laterally extending portion 24a of the bearing 24.

With the traction unit secured through sleeves 20 relatively to the main frame, and with the wheels 18 in position on the sleeves 20 and splined to the drive shaft 17 as shown in Fig. 7, it is quite obvious that actuation of the motor 15 will drive the shaft 17 and wheels 18, provided some means are present to absorb the torque tending to rotate the traction unit on bearing portions 22, 23 about the axis of drive shaft 17 and the sleeves 20.

To this end, there is secured to the upper end of the gear box 16 an ear 27 constructed as is best shown in Fig. 8. The small threaded end 28 of a shaft 30 extends through an opening 29 in the ear 27, as is shown in Fig. 8, and is secured to the ear 27 through a nut 31 mounted on said threaded end. The nut 31 cooperates with the shouldered portion 32 of the shaft 30, a pair of metal washers 33, and a pair of rubber disks 34, as is clearly shown. It will be appreciated that because of the particular mounting, the rubber disks 34 will absorb any vibration between the shaft 30 and the traction unit ear 27. The end of the shaft 30 opposite end 28 is threaded as at 35, and is secured through the said threads and a locking nut 36 to a threaded lug 37 integral with the cross frame member 13.

At this point, it should be indicated that the cross frame member 13 has an opening 38 through which extends the motor housing 15 of my traction unit. It will now be readily appreciated that the power generated by the motor of the power unit will drive the shaft 17 transmitting motion to the wheels 18, the torque thus developed about the drive shaft 17 being accepted by the shaft 30 connected to the main frame through cross frame 13, and with the vibration incidental to said acceptance of the torque being absorbed by the rubber disks 34. It must be emphasized that the shaft 30 is mounted for resisting forces of tension and compression only, and is therefore positioned tangentially to the circle in which the traction unit rotates, all as is readily seen.

Having now described the mounting of my traction unit, I shall describe the mounting of the tilting uprights. These uprights are of the usual familiar form known to the art, their sectional shape being best shown in Figs. 2 and 7, wherein the uprights are designed by reference numeral 39. Secured to each of the uprights 39 by riveting or welding, is a bearing sector 40, this bearing sector being bored out as at 41 for mounting about the sleeve 20, as is probably best illustrated in Figs. 5 and 7. Because of this particular construction, it is readily observed that each of the uprights 39 will readily tilt about a sleeve 26. The upright bearing portions 40 are confined on the sleeves 20 at one side by a surface of the cross frame member 21 and removable bearing 24, and by a sleeve 56 on the other side.

Mounted for vertical sliding movement on the uprights 39 is a fork platform 42 carried by a vertically sliding carriage 43, best illustrated in Fig. 1. This carriage 43 has mounted on each side thereof a series of three rollers 44 which lie between the flanges of the channels forming the vertical uprights 39, and guide the carriage in its vertical movement.

For moving the carriage 43 up and down on the uprights 39, I utilize two pairs of chain members, one pair operating on one side of the carriage 43, while the other pair cooperates with the other side of the carriage 43 to yield a more uniform lifting action. Only one pair of chains will be described here. This pair is designated by reference numeral 45, and carries at one end thereof a link 46 which through a bolt 47 is secured to the carriage 43. The pair of chains extends upwardly from its point of fastening by bolt 47, as is best illustrated in Fig. 1, over a pair of sprocket wheels 48 supported by uprights 39, then downwardly over a pair of sprocket wheels 49, then upwardly to the carriage 43, where they are secured to the end of a lever 50.

It will now be appreciated that when motion is transmitted to each of the pairs of chains 45 through the lower pairs of sprockets 49 shown in Fig. 7, the pairs of chains will act to move the carriage 43 upwardly or downwardly, as the case may be, to elevate the fork platform 42.

In describing the lifting of the carriage 43, I pointed out that each pair of chains 45 is arranged to travel over and to be actuated by a pair of sprockets 49. It should now be indicated that these sprockets 49 are integral with sleeve 56 on which is also formed a third sprocket 57 of considerably larger size than the sprockets 49. Each sleeve 56 rotates freely about its sleeve 20, and is of such length as to occupy all of the space between the bearing portion 40 of the tilting uprights 39, and a horizontal flange 58 extending from the sleeve 20, as is best shown in Fig. 7. At this point, it will simply be indicated that the sprocket 57 is driven by a chain 59, and thus transmits motion to the sprockets 49, which in turn through chains 45 actuate the vertically moving carriage 43, as has already been indicated.

I shall now describe the means for actuating each of the chains 59 and the sprockets 57 for elevating the carriage 43. The unit which drives each chain 59 is termed a lift unit, and is best shown in detail in Fig. 5, although its relation to the main frame of the truck is well shown in Fig. 1. Referring now to Figs. 1 and 5, the lift unit comprises a motor 60 which through a set of gears contained in a gear box 61, drives a shaft 62. The cross frame member 13 has a bracket 63, probably best shown in Figs. 5 and 6, which is drilled and tapped as at 64 for cooperation with a pair of bolts 65, which secure to the bracket 63 a tilting unit supporting bracket 66.

This bracket 66 through the shaft 67 secured thereto supports a bearing member 68 carrying a ball bearing 69 for mounting in rotatable relation the drive shaft 62. This drive shaft 62 carries a pair of sprockets 70 which drive the chains 59. As has already been indicated, it is the chains 59 which drive the sprockets 57 which in turn, because they are each integral with the sleeves 56 carrying sprockets 49, drive the lift chains 45. At this point, it is well to indicate that the chains 59 driven by the sprockets 70 carried on the shaft 62, traverse holes 71 formed in a part of the cross frame member 13, as will be quite apparent.

For completing the support of the lift unit, one end of the gear box 61 has secured thereto as by pin 72, a link 73, which is adjustable through a nut 74 and carries a fork 75 pinned at 76 to the main frame. The lift unit is also shown with the usual solenoid brake 77 actuated by the solenoid 78, these parts being of a usual type well known in the art, and therefore not requiring any further detailed explanation.

It will be well at this time to analyze briefly the construction so far described. It will be quite evident that a traction unit comprising a drive shaft and sleeves, is mounted about the axis of the drive shaft on the main frame of the truck. The only other connection between the traction unit and the main frame is means for absorbing the torque incidental to the transmission of tractive effort to the traction wheels. It will also be remembered that the tilting uprights are mounted for rotation about the axis of the drive shaft, and that the sprockets for driving the chains which actuate the lifting carriage are also mounted for rotation on the axis of the drive shaft. As for the lift unit, it is supported on its drive shaft, and a torque link connects it to the main frame.

I shall now describe the mounting of the tilt unit and the manner in which the tilt unit tilts the uprights. The tilt unit is probably best shown in Figs. 9 and 10, and as there shown comprises an electric motor 79, gear boxes 80 and 81 containing gears, and a drive shaft 82 actuated by the motor through the gears in boxes 80 and 81. This drive shaft 82 is supported at its opposite ends in adjustable bearings 83 and carries a sprocket 84 at each of its opposite ends for driving a chain 85, each chain in turn driving a sprocket wheel 86 integral with a pinion 87. Each pinion 87 in turn drives a rack 88 which is pivoted at 89 to the uprights 39. It will now be quite readily appreciated that rotation of shaft 82 through operation of the motor 79 will through sprockets and chains 84, 85 and 86, drive the pinions 87, which through racks 88 will tilt the uprights 39 into any position which may be desired.

As is quite readily seen in Fig. 10, the entire tilt unit is supported on the shaft 82. For absorbing the torque which is developed by the tilt unit tending to rotate it on the axis of the shaft 82, there extends from gear box 81 an arm 81a which is secured through a pin 90 to the frame of the truck as at 91, the principle involved being the same as that described with regard to Fig. 6, in which the means for accepting the torque of the traction unit were described.

In addition to the mechanism just described, Fig. 9 shows also a pair of controllers 92 and 93, and operating levers 94 and 95. These controllers are used for controlling the various electric motors which have been described, all of which will be readily appreciated by those skilled in the art. These controllers are positioned above and in front of the lower medial portion 11 of the main frame so as to be readily operable by a man occupying the truck platform. Naturally, there is a controller for each power unit which has so far been described, and an additional controller for the power steering mechanism which is shown in this application, but which is not described in detail or claimed since it forms the subject of an additional application, as has already been set forth.

For purposes of clarity, it should be indicated, however, that the power steering motor is designated by reference numeral 96 in Figs. 1 and 2, and is controlled by a controller through handle 97. The motor 96 operates through a gear box 98 to rotate the steering wheels 103 of the truck through connecting links 99, 100, 101 and 102, as is best illustrated in Fig. 2.

The wheels 103 are mounted in a pocket 104 formed in the main frame 10, the upper portion of this pocket being arranged for the mounting of a battery which forms the power source for the various power units herein described. This mounting of the battery is important, since it acts to counterbalance the load placed on the forks at the opposite end of the truck. The lower half of the pocket 104 contains longitudinally spaced bearing portions 105 and 106 which support a bearing shaft 107. A cross beam member 108 has formed thereon a medial sleeve portion 109, through which passes the bearing shaft 107. In this way, the cross beam member 108 is supported for pivotal movement relatively to the main frame about the longitudinal bearing shaft 107.

The beam 108 is bored at each of its opposite ends at 110 for the insertion of a vertical shaft 111 of a wheel supporting fork 112 (Fig. 1). Each wheel supporting fork 112 carries a wheel 103 about a shaft 113, each wheel 103 and its fork 112 being rotatable about the vertical shaft 111, and thus about an axis passing centrally and diametrically through each wheel.

The operation of the truck embodying my invention being now quite clear, I claim:

1. In a truck of the class described, a main frame, a traction unit comprising a vertically positioned gear casing, the lower end of which has extending therefrom a pair of axle housings, bearing means for said axle housings formed on said main frame whereby said traction unit is mounted for rotation relatively to said main frame while held against displacement bodily relatively thereto, a horizontally disposed traction motor, a casing for said motor extending horizontally from said gear casing, a rod secured to the upper end of said gear casing and extending horizontally to said main frame, and means securing the rod to said main frame whereby said rod accepts the driving torque of said traction unit.

2. In a truck of the class described, a main frame, a traction unit comprising a vertically positioned gear casing, the lower end of which has extending therefrom a pair of axle housings, bearing means for said axle housings formed on said main frame whereby said traction unit is mounted for rotation relatively to said main frame while held against displacement bodily relatively thereto, a traction motor, a casing for said motor extending from said gear casing, a rod secured to the upper end of said gear casing and extending horizontally to said main frame, and means securing the rod to said main frame whereby said rod accepts the driving torque of said traction unit.

3. In a truck of the class described, a main frame, a traction unit for said truck comprising a gear casing, a traction motor, and horizontally extending axle housings, bearings on a fixed part of said main frame on which said horizontally extending axle housings are rotatably mounted and whereby said traction unit is entirely supported as a unit by said bearings and is adapted to rotate on said main frame while held against displacement bodily relatively to said main frame, a tension and compression rod fixed at one end to said main frame and at its other end to said traction unit and positioned to accept axially thereof the torque of said traction unit tending to rotate said traction unit relatively to said main frame, and resilient pads insulating at least one end of said tension and compression rod relatively to the means to which said end is fixed.

4. In a truck of the class described, a main frame, a traction unit for said truck comprising a gear casing, a traction motor, and horizontally extending axle housings forming part of said gear casing, bearings on a fixed part of said main frame on which said horizontally extending axle housings are rotatably mounted whereby said traction unit is entirely supported as a unit by said bearings and is adapted to rotate on said main frame, a tension and compression rod fixed at one end to said main frame and at its other end to said traction unit and in a position to accept axially thereof the compression and tension forces developed by said traction unit tending to rotate said traction unit on said main frame, while relieved by said bearing means of the weight of said traction unit and the forces tending to move said traction unit bodily relatively to said main frame.

BRONISLAUS ULINSKI.